(12) United States Patent
Barney et al.

(10) Patent No.: US 12,223,849 B2
(45) Date of Patent: Feb. 11, 2025

(54) SYSTEM AND METHOD FOR OPTIMIZED UNMANNED AIRCRAFT SYSTEM (UAS) SPECTRUM PLANNING VIA DYNAMIC AIRSPACE AND SPECTRUM ALLOCATION

(71) Applicant: Rockwell Collins, Inc., Cedar Rapids, IA (US)

(72) Inventors: George Tyler Barney, North Liberty, IA (US); Nicholas Liberko, Marion, IA (US); Boe A. Svatek, Cedar Rapids, IA (US); Kevin McElroy, Vint Hill Farms, VA (US); David Fogerty, Marion, IA (US); Corrie E. Block, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 255 days.

(21) Appl. No.: 17/361,893

(22) Filed: Jun. 29, 2021

(65) Prior Publication Data

US 2021/0407304 A1 Dec. 30, 2021

Related U.S. Application Data

(60) Provisional application No. 63/046,097, filed on Jun. 30, 2020.

(51) Int. Cl.
*G08G 5/00* (2006.01)
*B64U 101/20* (2023.01)

(52) U.S. Cl.
CPC ......... *G08G 5/0069* (2013.01); *G08G 5/0013* (2013.01); *G08G 5/003* (2013.01); *B64U 2101/20* (2023.01)

(58) Field of Classification Search
CPC .............. B64C 39/024; B64U 2101/00; B64U 2101/20; G08G 5/0013; G08G 5/003;

(Continued)

(56) References Cited

U.S. PATENT DOCUMENTS

| 10,038,544 B2 | 7/2018 | Zeng et al. |
| 10,210,764 B2 | 2/2019 | Weisbrod et al. |

(Continued)

FOREIGN PATENT DOCUMENTS

| IL | 256934 A | 3/2018 |
| WO | 2018019394 A1 | 2/2018 |

OTHER PUBLICATIONS

Dronbelow, URL: https://dronebelow.com/2018/06/26/drones-and-geofencing-how-it-works-benefits-requirements/, Downloaded Apr. 29, 2020.

(Continued)

*Primary Examiner* — Adam D Tissot
*Assistant Examiner* — Aaron K McCullers
(74) *Attorney, Agent, or Firm* — Suiter Swantz IP

(57) ABSTRACT

An unmanned aircraft system (UAS) control apparatus is disclosed. In embodiments, the UAS control apparatus is embodied in a control station to manage command and control (C2) functions for UAS operations in a designated coverage volume including a geofenced interference region proximate to the control station, controlling each UAS via connections on a spectrum of C2 channels. The UAS control apparatus generates flight plans for UAS operations, providing separation and keeping UAS operations away from the control station to minimize RF interference with other UAS C2 connections. Should a UAS be required to operate proximate to the control station, the UAS control apparatus employs dynamic spectrum management with respect to other concurrently operating UAS to eliminate, reduce, or mitigate RF interference resulting from the encroaching UAS.

9 Claims, 7 Drawing Sheets

(58) Field of Classification Search
CPC .... G08G 5/0039; G08G 5/0043; G08G 5/006; G08G 5/0069
USPC ...... 701/3, 14, 23, 24, 25, 26, 27, 120, 410, 701/411, 412, 528, 533
See application file for complete search history.

(56) References Cited

U.S. PATENT DOCUMENTS

| | | |
|---|---|---|
| 10,429,836 B2 | 10/2019 | Hong et al. |
| 2016/0012730 A1* | 1/2016 | Jarrell .................. G08G 5/0091 701/4 |
| 2016/0114886 A1 | 4/2016 | Downey et al. |
| 2016/0284221 A1 | 9/2016 | Hinkle et al. |
| 2017/0069214 A1* | 3/2017 | Dupray ................ G08G 5/0008 |
| 2017/0372618 A1 | 12/2017 | Xu et al. |
| 2018/0004207 A1* | 1/2018 | Michini ................ G05D 1/0088 |
| 2018/0217267 A1* | 8/2018 | Lim ........................ H04B 7/185 |
| 2018/0375568 A1* | 12/2018 | De Rosa ............ H04B 7/18506 |
| 2019/0164435 A1 | 5/2019 | Cui et al. |
| 2019/0236962 A1 | 8/2019 | Tholen et al. |
| 2019/0302798 A1* | 10/2019 | Winkle ................... H04W 4/44 |
| 2020/0005652 A1* | 1/2020 | Priest ................... G08G 5/0039 |

OTHER PUBLICATIONS

Extended Search Report for European Application No. 21182932.0 dated Nov. 25, 2021, 7 pages.

* cited by examiner

SYSTEM AND METHOD FOR OPTIMIZED UNMANNED AIRCRAFT SYSTEM (UAS) SPECTRUM PLANNING VIA DYNAMIC AIRSPACE AND SPECTRUM ALLOCATION

RELATED APPLICATIONS

U.S. Provisional Patent Application Ser. No. 63/046,097 entitled SYSTEM AND METHOD FOR OPTIMIZED UNMANNED AIRCRAFT SYSTEM (UAS) SPECTRUM PLANNING VIA DYNAMIC AIRSPACE AND SPECTRUM ALLOCATION and filed Jun. 30, 2020;

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

Said U.S. Provisional Patent Application 63/046,097 is herein incorporated by reference in its entirety.

TECHNICAL FIELD

The subject matter disclosed by the instant application is directed generally to unmanned aircraft systems (UAS) and more particularly to systems and methods for communicating with, and remotely operating, said UAS.

BACKGROUND

Safe unmanned aircraft system (UAS) operations, especially operations beyond visual line of sight (BVLOS), require robust command and control (C2) datalinks with each UAS in order to ensure positive control of the UAS. Positive control ensures safe UAS operations, which in turn prevents property damage and human injury. However, the UAS aviation safety radio frequency (RF) spectrum is finite. Responsible BVLOS operations require spectrum preplanning which accounts for expected C2 datalink coverage, the potential for interference between UAS, and the spectrum required to support safe operations. For example, when a UAS flies too close to a C2 control facility, RF interference will result; traditional spectrum planning must account for worst-case RF interference scenarios. Mitigating against C2 spectrum interference is the spectrum bottleneck associated with limited spectral availability, which prevents closer channel spacing and therefore limits the number of UAS able to use the protected spectrum in a given area (and by extension the UAS density throughout operating airspace).

SUMMARY

An unmanned aircraft system (UAS) control apparatus is disclosed. In embodiments, the UAS control apparatus includes antenna elements mounted to a mobile or, more commonly, fixed control station. Each antenna element transmits to some or all of a coverage volume within which one or more UAS are authorized to operate (e.g., their flight plans, operations, and/or missions managed by the control apparatus). The antenna elements establish command and control (C2) connections (e.g., datalinks) to each UAS via a spectrum of C2 channels. A restricted area or volume directly proximate to the control station may be a geofenced volume (e.g., geofenced because any induction by a UAS into the restricted volume may result in RF interference over one or more C2 channels in use). The control station includes control processors configured for executing stored instructions for generation and management of flight plans and UAS operations throughout the corresponding coverage volume. For example, the control station generates flight plans (e.g., routes) through the coverage volume for beyond visual line of sight (BVLOS) operations, each flight plan executable by a UAS. Where possible, generated flight plan provide for physical separation between UAS and prohibit any UAS from encroaching upon the geofenced volume. While operating in the coverage volume, each UAS maintains a C2 datalink to the control station over a C2 channel of the control spectrum, via which the control station transmits C2 messages to the UAS.

In some embodiments, a generated flight plan includes a portion whereby a UAS must encroach upon the geofenced volume; the control station adjusts the control spectrum (e.g., via dynamic allocation or redefinition of C2 channels or other spectrum resources) in response to the encroachment.

In some embodiments, the control station establishes a C2 connection to the encroaching UAS within an interference portion of the spectrum (e.g., so called because the UAS encroachment upon the geofenced volume results in RF interference to adjacent channels on the control spectrum). The control station may establish C2 connections to other concurrently operating UAS within the coverage volume within non-interference portions of the control spectrum (e.g., channels or spectrum segments not adjacent or proximate to the interference portion) to prevent RF interference from impeding concurrent operations of the other UAS.

In some embodiments, the control station (where possible) responds to an actual or potential UAS encroachment by restricting the count of other concurrently operating UAS to the number of additional UAS supported by the remaining non-interference portions of the C2 spectrum.

In some embodiments, the control station responds to an actual or potential UAS encroachment by establishing a C2 connection to two or more non-encroaching UAS on a single non-interference channel (e.g., via alternating timeslots).

In some embodiments, the control station adjusts the bandwidth of one or more non-interference channels (e.g., via creating reduced-bandwidth channels for temporary C2 connections to non-encroaching UAS).

In some embodiments, the control station transmits to the encroaching UAS (e.g., via a C2 connection within the interference portion) at a reduced power level.

In some embodiments, the control station places the interference portion at one end of the C2 spectrum and the non-interference portion at the opposite end.

In some embodiments, the control station may respond to a potential or actual encroachment by switching over a non-encroaching UAS to an adjacent control station controlling operations within an adjacent coverage volume.

In some embodiments, the control station reallocates a portion of its control spectrum to another control station, e.g., associated with another coverage volume.

In some embodiments, the antenna elements include directional antenna elements oriented to transmit to a particular subset or sub-region of the coverage volume.

In some embodiments, the control station modifies flight plans or the C2 control spectrum in response to an encroachment of the geofenced volume by a noncooperative UAS, e.g., a UAS not otherwise authorized to operate within the coverage volume or accounted for by generated flight plans.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
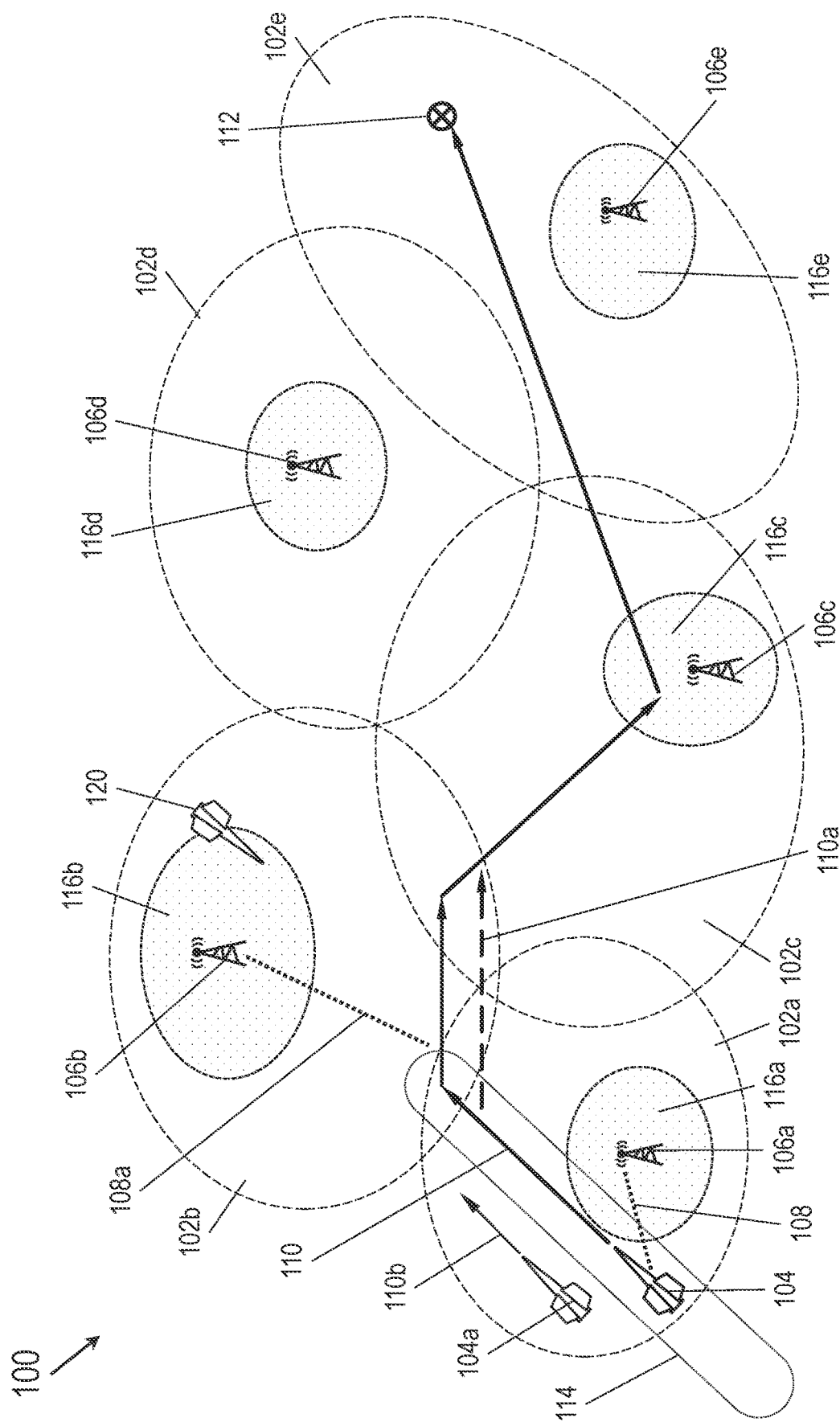
FIG. 1 is a diagrammatic illustration of an operational space for unmanned aircraft systems (UAS) according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring now to FIG. 1, an unmanned aircraft system (UAS) operational space 100 is disclosed. The operational space 100 may include coverage volumes 102a-e and UAS 104 (e.g., coverage spaces). Each coverage volume 102a-e includes a command and control (C2) control station 106a-e.

In embodiments, C2 may refer to an aeronautical communications infrastructure for providing secure data links between UAS (e.g., small UAS (sUAS)) and their pilots-in-command (PIC) for both line-of-sight (LOS, e.g., visual line-of-sight (VLOS), radio line-of-sight (RLOS)) and beyond LOS (BVLOS) operations. For example, C2 may incorporate specialized waveforms (e.g., control and non-payload communications (CNPC) for datalink operating cooperatively with Automatic Dependent Surveillance-Broadcast (ADS-B) transponders within dedicated bandwidth (e.g., L-band (960-1215 MHz; note that ADS-B transponders transmit at 1060 or 1090 MHz); optionally C-band (4-8 GHz), K-band (12-18 GHz), and/or $K_a$-band (26.5-40 GHz)). In embodiments, the particulars of C2 connectivity within a specific airspace and/or to a specific UAS may depend fully or partially on a variety of factors, e.g., operating conditions (LOS/BLOS); atmospheric conditions; and/or airspace class.

In embodiments, each C2 control station 106a-e may include a C2 control apparatus configured for planning and monitoring UAS traffic through its associated coverage volume 102a-e. For example, a given coverage volume 102a-e may comprise a surface area (e.g., circular, elliptical, polygonal, irregularly shaped) and the space from the ground to a particular altitude above the surface area (e.g., a cylindrical coverage volume having a consistent altitude above ground level (AGL) or a coverage volume of inconsistent altitude, e.g., if the C2 control station 106a-e is at a high altitude and/or the associated terrain is uneven). The C2 control station 106a-e may include a control tower or, more broadly, any fixed or mobile facility or location supporting a C2 source, e.g., ground-based or water-based vehicles, aircraft, buildings or other structures. In some embodiments, the shape and/or size of the coverage volume 102a-e may be a function of the range within which the C2 control apparatus in the associated C2 control station 106a-e can transmit a signal sufficiently strong to establish a C2 connection 108 (e.g., datalink) to a UAS 104 within the coverage volume and thereby transmit control signals to the UAS.

In embodiments, operations preplanning for each UAS 104 within the operational space 100 may include a flight plan 110 through one or more coverage volumes 102a-e from an origin point toward a destination 112. For example, when the UAS 104 enters a given coverage volume 102a, the UAS may detect signals transmitted by the corresponding C2 control station 106a and locate the C2 control station by identifying the transmitted signals as C2 control signals. If the transmitted signals are sufficiently strong, the UAS 104 may establish a C2 connection 108 to the C2 control station 106a, maintaining the C2 connection while the UAS passes through the coverage volume 102a. When the UAS 104 enters an adjacent coverage volume (102b; e.g., a subsequent coverage volume, from the perspective of the flight plan 110) the UAS may listen for signals transmitted by the corresponding C2 control station 106b and, if the transmitted signals are sufficiently strong, establish a new C2 connection 108a to the new C2 control station 106b. In some embodiments, the flight plan 110 may be designed (110a) to minimize the total number of transitions between coverage volumes 102a, 102c and their corresponding control facilities (e.g., bypassing the coverage volume 102b and C2 control station 106b by switching over from the control facility 106a to the control facility 106c) and/or minimize communications overhead.

Broadly speaking, the planning and monitoring of UAS traffic through the coverage volume 102a-e may be a multidimensional operation encompassing, e.g., platform limitations, airspace regulations and limitations, mission requirements, and opportunities for optimization, any of which may be established or modified during pre-planning stages or inflight as a response to changing environmental and/or operating conditions. For example, the flight plan 110 may be adjusted spatially, e.g., redirecting the UAS 104 away from a given control station 106b. In embodiments, the flight plan 110 may also be adjusted temporally, e.g., via adjusting the start time of the associated mission, speeding up or slowing down one or more segments of the flight plan, and/or introducing loiter patterns into the flight plan. Similarly, the C2 spectrum via which C2 connections to operating UAS 104 are established by the control stations 106a-e may be adjusted as needed, e.g., via dynamic reallocation or redefinition (e.g., expansion, restriction) of C2 channels within the spectrum or dynamic reallocation of spectrum bandwidth between control stations. In some embodiments, the planning and monitoring of UAS traffic through the coverage volumes 102a-e may be implemented in conjunction with urban air mobility (UAM) initiatives for safely managing UAS traffic over, or proximate to, urban areas as allowed by applicable regulations.

In embodiments, each flight plan 110 generated by a control apparatus embodied in a C2 control station 106a for all UAS traversing its corresponding coverage volume 102a may provide appropriate spatial separation 114 between the UAS 104 and any other UAS (104a) whose flight plan (110b) may result in a proximate position to that of the UAS 104. For example, the amount of spatial separation 114 provided may be determined by local regulations or mission parameters.

In embodiments, each coverage volume 102a-e may include a geofenced volume 116a-e therewithin, each geofenced volume proximate or adjacent to the corresponding C2 control station 106a-e. For example, the shape and volume of a given geofenced volume 116a-e may vary as would the shape and volume of coverage volumes 102a-e, according to a variety of factors (e.g., the signal strength of a given control station 106a-e). In embodiments, each flight plan 110 through a coverage volume 102a generated by the control apparatus in corresponding C2 control station 106a may attempt, to the extent possible, to avoid any encroachment by a UAS 104 on the corresponding geofenced volume 116a directly adjacent to the control station. As any encroachment by a UAS 104 on a geofenced volume 116a may result in RF interference with C2 connections 108 to other UAS (104a) within the coverage volume 102a, preventing such RF interference may provide for optimal spectrum availability and UAS density within the coverage volume. In some embodiments, the encroaching UAS may be a noncooperative UAS 118, e.g., a UAS not originally accounted for by the flight plan 110, or that is not otherwise authorized to operate within the coverage volume 102a-e by any of the control stations 106a-e.

Figure 2:
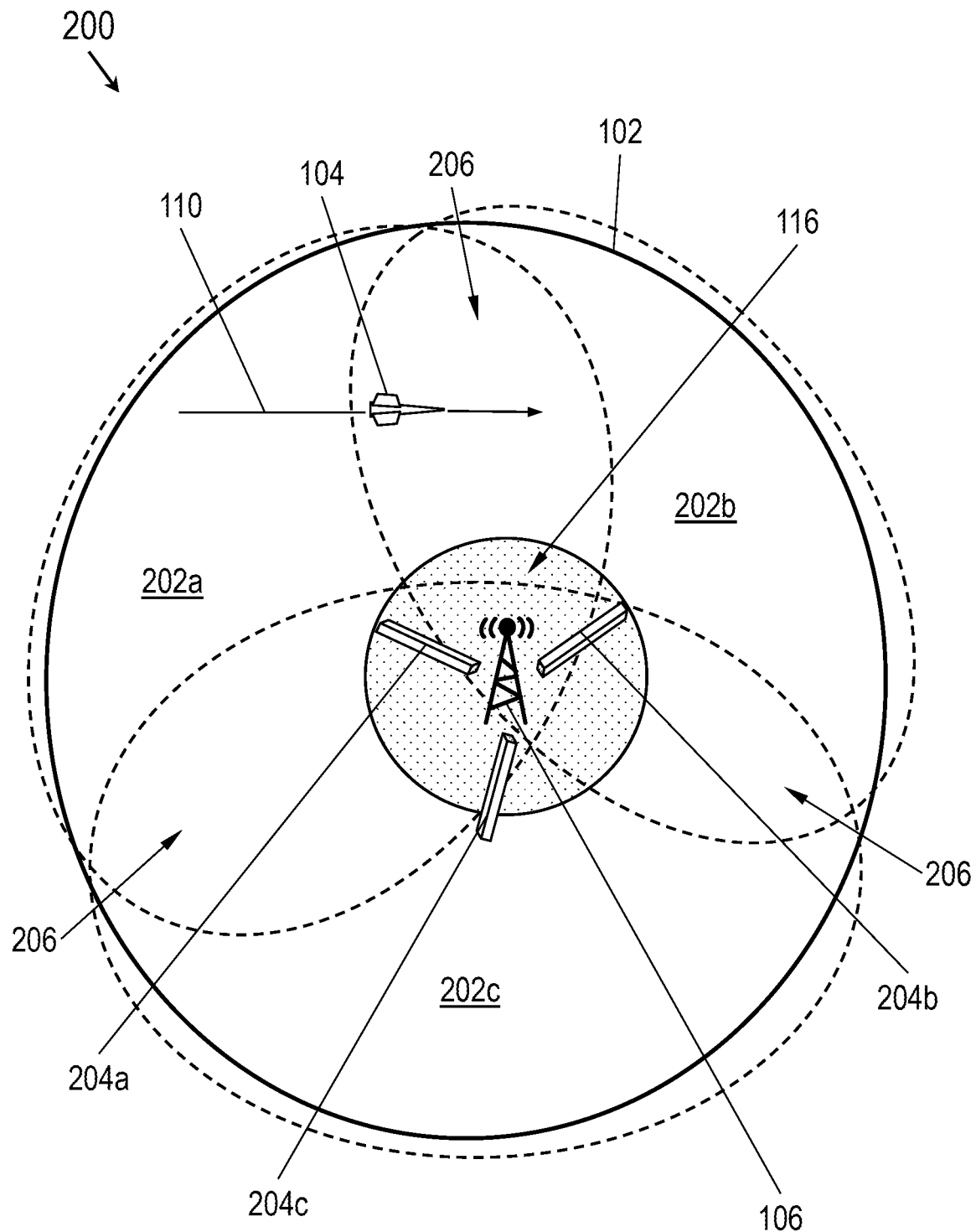
FIG. 2 is a diagrammatic illustration of directional antenna elements and coverage subsets in the operational space of FIG. 1.

Referring now to FIG. 2, the C2 control apparatus 200 may be implemented and may function similarly to the C2 control apparatus 100 of FIG. 1m except that the C2 control apparatus 200 (e.g., embodied in the C2 control station 106) may include directional antenna elements 204a-c, each directional antenna element dedicated to a particular sector 202a-c (e.g., subset volume) of the corresponding coverage volume 102.

In embodiments, the flight plan 110 of the UAS 104 may extend from the sector 202a into the adjacent sector 202b. For example, the adjacent sectors 202a-b may each be associated with different directional antenna elements 204a-b dedicated to C2 operations within the associated sector. In embodiments the coverage volume 102 may include transitional regions 206 where adjacent sectors 202a-b, 202a-c, 202b-c may overlap. For example, at some point (e.g., within the transitional region 206) the UAS 104 may be switched over from the directional antenna element 204a (e.g., managing operations within sector 202a) to the directional antenna element 204b (e.g., managing operations within sector 202b). In embodiments, each directional antenna element 204a-c may be configured (e.g., via digitization processes) to minimize interference (e.g., RF interference due to encroachment on the geofenced volume 116, potential interference from other directional antenna elements of the same C2 control station 106) such that a switchover of the UAS 104 from the directional antenna element 204a to the directional antenna element 204b may occur transparently, the switchover imperceptible to the UAS 104. From the perspective of the UAS 104, the UAS may appear to remain under the control of the C2 control station 106 throughout.

Figure 3:
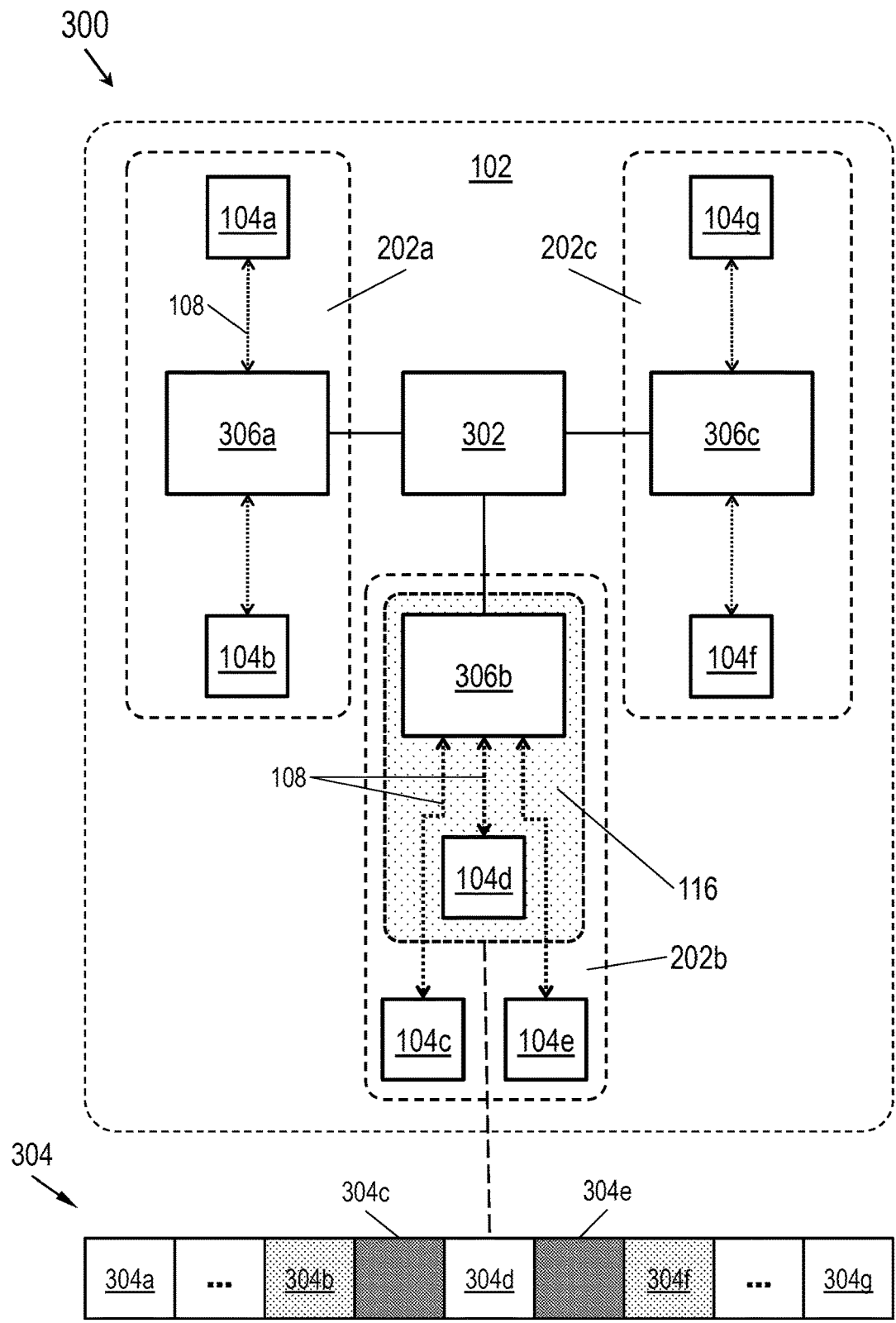
FIG. 3 is a block diagram illustrating an UAS control apparatus according to example embodiments of this disclosure.

Referring now to FIG. 3, the C2 control apparatus 300 is shown. The C2 control apparatus 300 may be embodied in a C2 control station (106a-e, FIG. 1) and dedicated to the coverage volume 102 corresponding to the C2 control station. The C2 control apparatus 300 may include a C2 transceiver 302 and a C2 control spectrum 304 comprising C2 channels 304a-g.

In embodiments, the C2 transceiver 302 may include control processors for generating and monitoring flight plans (110, FIG. 1) for all UAS traffic (104a-g) traveling through the coverage volume 102 at any given time. While the UAS traffic 104a-g is within the coverage volume 102, the C2 transceiver 302 may establish a C2 connection 108 to each UAS on a different C2 channel 304a-g. For example, the C2 transceiver 302 may establish and monitor multiple C2 connections across subset volumes 202a-c of its coverage volume 102 via directional antenna elements 306a-c, allowing more precise management of UAS traffic through the coverage volume as opposed to a single antenna element.

In embodiments, the flight plan (110, FIG. 1) of one or more UAS (104d) may necessarily or unintentionally encroach upon the geofenced volume 116 within the coverage volume 102 and proximate to the C2 transceiver 302 or C2 control station (106a-e, FIG. 1). For example, the proximity of the UAS 104d to the C2 transceiver 302 may result in RF interference on the C2 control spectrum 304. If the C2 connection 108 to the UAS 104d is established on a C2 channel 304d, the immediately adjacent C2 channels 304c, 304e may experience significant RF interference while other proximate C2 channels 304b, 304f experience lower or moderate interference.

Figure 4A:
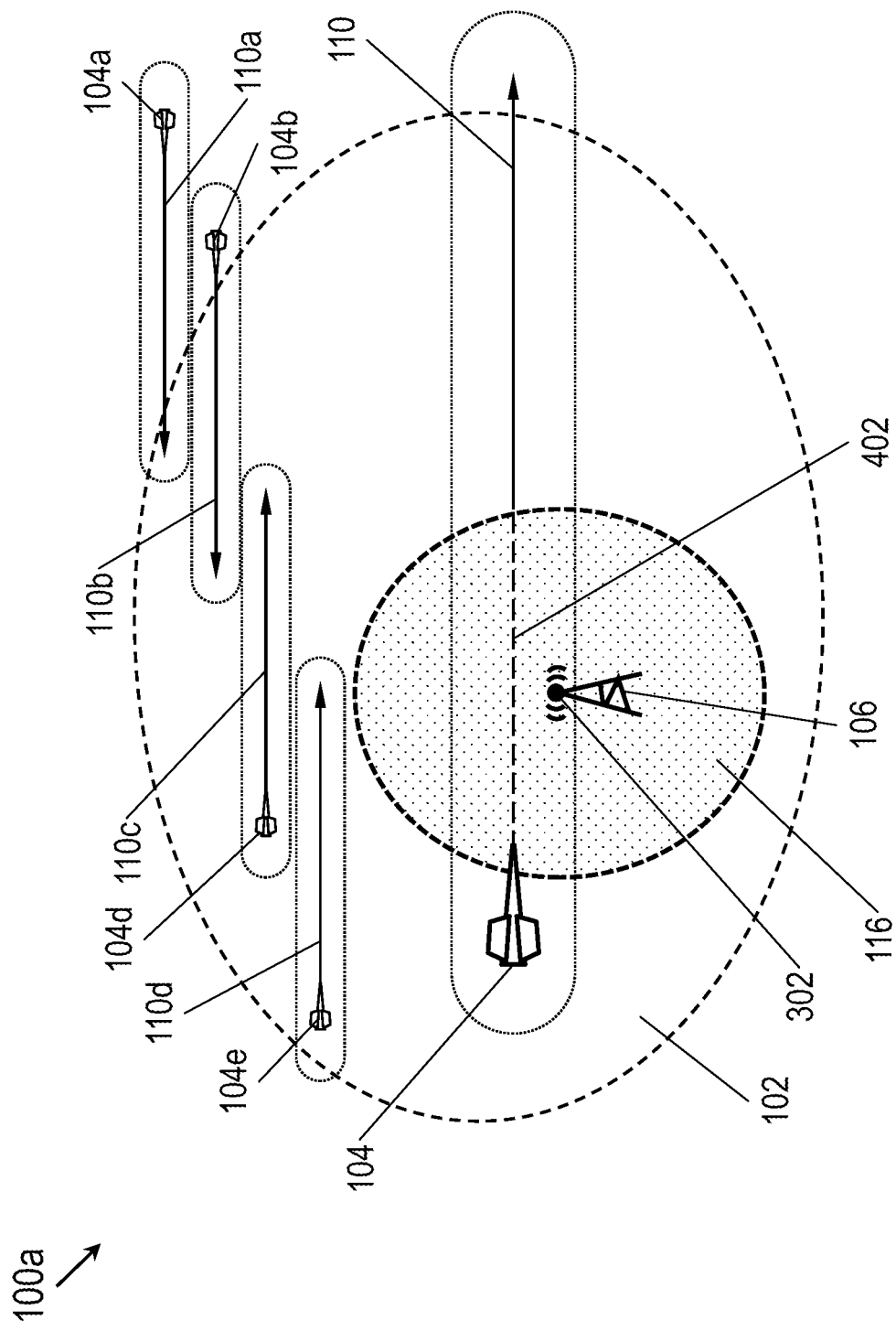
FIG. 4A is a diagrammatic illustration of the operational space of FIG. 1 illustrating operations of the UAS control apparatus of FIG. 3.

Referring now to FIG. 4A, the UAS operational space 100a may be implemented and may function similarly to the UAS operational space 100 of FIG. 1, except that within the operational space 100a, flight plans 110, 110a-d for UAS traffic within a coverage volume 102 may require one or more UAS 104 to encroach upon the geofence volume 116 and operate in close proximity to the C2 control station 106 and C2 transceiver 302. For example, while the C2 transceiver 302 may, in generating flight plans for UAS traffic through the coverage volume 102, attempt to prevent any flight plan 110 from entering the geofenced volume 116, it may be necessary and/or unavoidable for the flight plan generated for the UAS 104 to encroach upon the geofenced volume and operate proximate to the C2 transceiver.

Figure 4B:
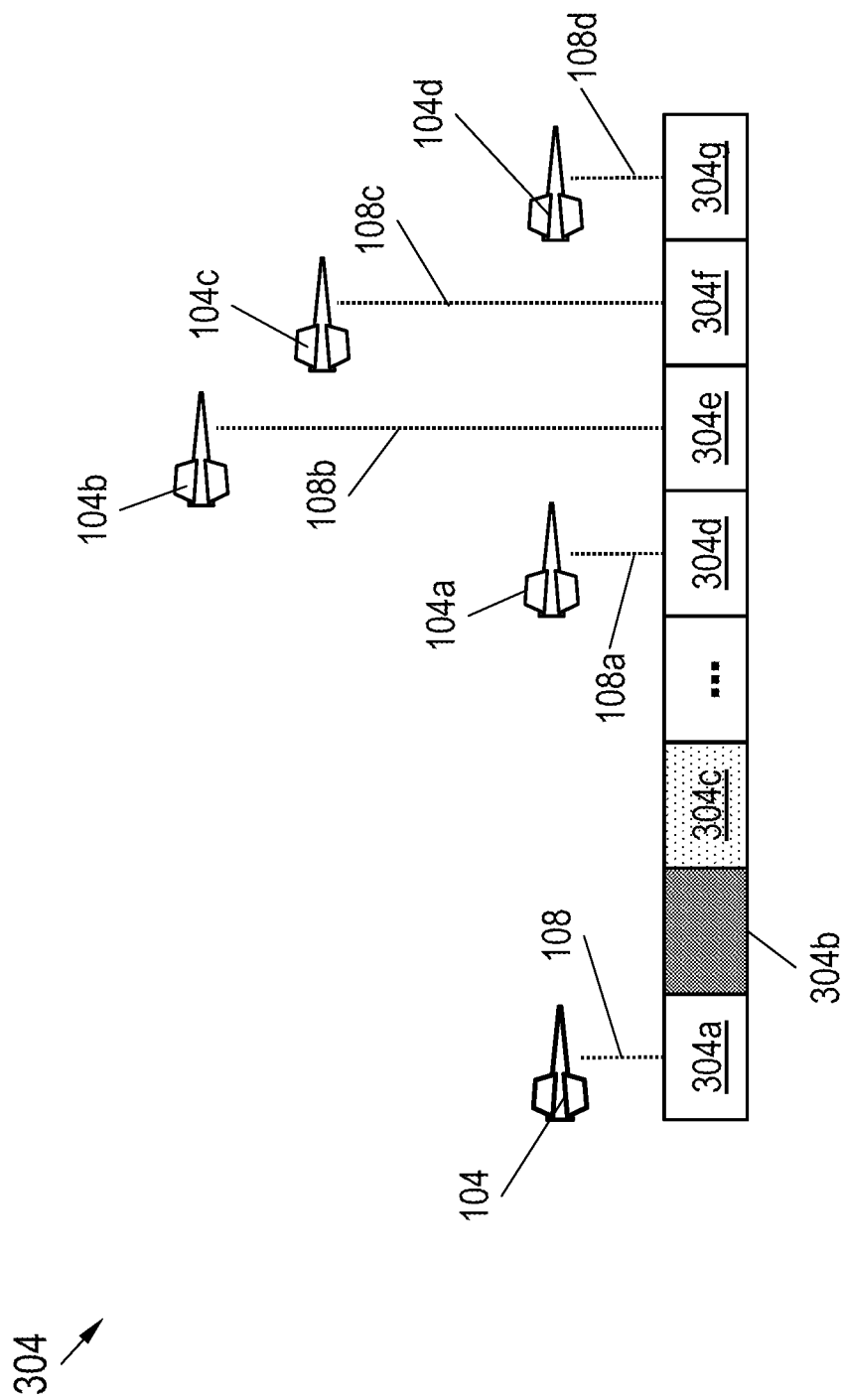
FIG. 4B is a diagrammatic illustration of a command and control (C2) communications spectrum associated with the operations of FIG. 4A.

Referring also to FIG. 4B, the C2 control spectrum 304 is shown. In embodiments, the C2 transceiver 302 may, when generating flight plans 110, 110a-d for all UAS traffic 104, 104a-d operating within the coverage volume 102 at any particular time, attempt to minimize any necessary UAS encroachments into the geofenced volume 116 to minimize RF interference. Further, when it is necessary for a UAS 104 to operate proximate to the C2 transceiver 302, the C2 transceiver may establish a C2 connection 108 to the UAS 104 on a C2 channel 304a that may result in RF interference on adjacent C2 channels 304b-c (e.g., an interference portion of the C2 control spectrum) but minimize total interference throughout the C2 control spectrum 304. For example, the C2 connection 108 may be established solely for the encroaching portion (402) of the flight plan 110 of the UAS 104 within the geofenced volume 108 or for the full flight plan 110, depending upon other concurrent UAS traffic needs or conditions. While the encroachment of the UAS 104, and its operation proximate to the C2 transceiver 302, may result in RF interference on adjacent channels 304b-c, the number of C2 channels 304a-g interfered with may be minimized. For example, the C2 connection 108 may be established on a C2 channel 304a at a low or high end of the C2 control spectrum 304, whereby only the C2 channels 304b-c on one side of the C2 channel 304a may be associated with some degree of RF interference. Similarly, the C2 transceiver 302 may establish C2 connections 108a-d to other UAS concurrently operating with the encroaching UAS 104 on non-interference portions of the C2 spectrum 304. For example, the C2 connections 108a-d may be established on C2 channels 304d-g at the opposite end of the C2 control spectrum 304, or elsewhere within any other portions of the C2 control spectrum not proximate to the interference portion (e.g., the C2 channels 304b-c associated with RF interference).

In embodiments, the C2 transceiver 302 may further mitigate the effects of RF interference resulting from the encroaching UAS 104 by restricting, to the extent possible, the number or count of UAS 104a-d operating concurrently with the encroaching portion 402 to no more than the number of available non-interference channels 304d-g remaining on the control spectrum 304.

In some embodiments, the C2 transceiver 302 may mitigate RF interference on the control spectrum 304 by transmitting C2 signals to the encroaching UAS 104 at a reduced power level, thereby reducing the scope of the resulting RF interference with C2 channels 304b-c adjacent to the C2 channel 304a on which the C2 connection 108 to the encroaching UAS 104 is established and increasing the number of non-interference C2 channels 304d-g capable of hosting a stable C2 connection 108a-d.

Figure 5A:
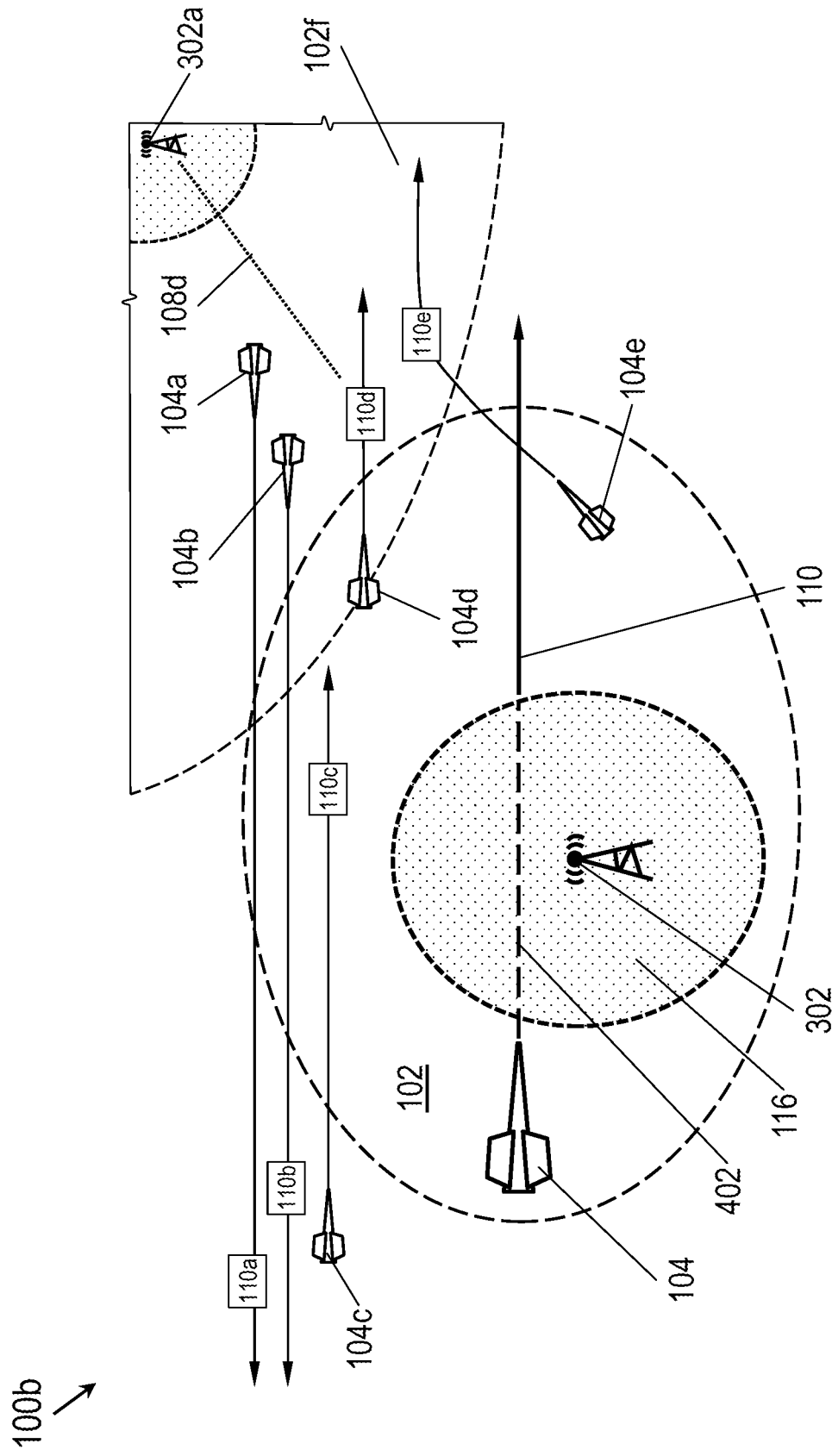
FIG. 5A is a diagrammatic illustration of the operational space of FIG. 1 illustrating operations of the UAS control apparatus of FIG. 3.
Figure 5B:
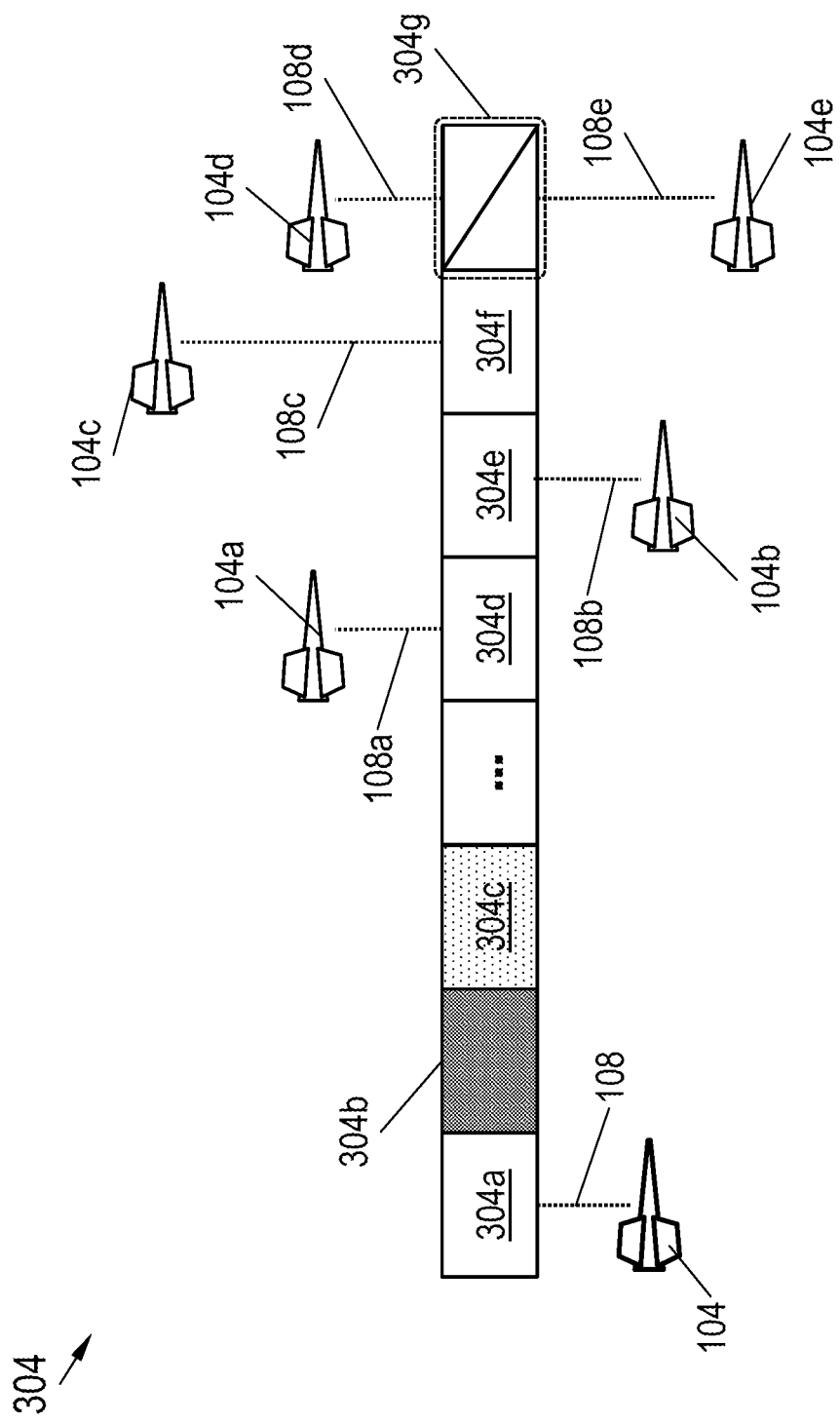
FIG. 5B is a diagrammatic illustration of a C2 control spectrum associated with the operations of FIG. 5A.

Referring now to FIGS. 5A and 5B, the operational space 100b may be implemented and may function similarly to the operational spaces 100, 100a of FIGS. 1 and 4A, except that within the operational space 100b, the C2 transceiver 302 may not be able to fully mitigate (as shown, e.g., by FIG. 4A) RF interference due to the flight plan 110 of a UAS 104 encroaching upon the geofenced volume 116 and operating proximate to the C2 transceiver 302. For example, the C2 transceiver 302 may be unable to prevent a UAS 104 from operating proximate to the C2 transceiver (e.g., within the geofenced volume 116) and may not be able to restrict the number of UAS 104a-e operating concurrently within the coverage volume 102, such that each concurrently operating UAS 104a-e is able to maintain a C2 connection 108a-e on a unique non-interference C2 channel 304d-g (FIG. 5B).

In embodiments, the C2 transceiver 302 may, prior to the encroachment (402) of the UAS 104 upon the geofenced volume 116, further mitigate RF interference resulting from off-nominal operations proximate to the C2 transceiver via novel spectrum sharing of the non-interference portion (304d-g) of the C2 control spectrum 304. For example, the C2 transceiver 302 may establish and maintain C2 connections 108d-e to respective UAS 104d-e on a single non-interference C2 channel 304g concurrent with the encroachment portion 402. The UAS 104d-e may receive C2 communications from the C2 transceiver 302 in alternating timeslots or otherwise share the C2 channel 304g while the corresponding C2 connections 108d-e operate at a reduced robustness.

In some embodiments, the C2 transceiver 302 may maintain communications with other adjacent C2 transceivers (302a, FIG. 5A) configured for monitoring UAS traffic through adjacent coverage volumes (102f). For example, in order to reduce the number of additional UAS 104a-e to be supported via the non-interference portion 304d-g of the C2 control spectrum 304, the C2 transceiver 302 may, via an existing C2 connection 108d to a supported UAS 104d, direct the supported UAS to listen for additional C2 signals and thereby determine whether the UAS 104d is within the effective range of the adjacent C2 transceiver 302a. In some embodiments, the UAS 104d may detect low-level transmissions from the adjacent C2 transceiver 302a while still outside its effective range (e.g., although the flight plan 110d of the UAS 104d may include a portion within the adjacent coverage volume 102f served by the C2 transceiver 302a), noting when the transmitted signals are sufficiently strong to support a C2 connection 108d. The C2 transceiver 302 may then switch the UAS 104d over (e.g., hand off, transfer) to the adjacent C2 transceiver 302a, which may establish a C2 connection 108d to the UAS (thereby freeing space on the C2 control spectrum 304 of the C2 transceiver 302 and its corresponding coverage volume 102).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An unmanned aircraft system (UAS) control apparatus, comprising:
    one or more antenna elements coupled to a control station, each antenna element configured to transmit to at least one portion of a coverage volume associated with the antenna elements, the coverage volume associated with 1) three or more unmanned aircraft systems (UAS) operating therewithin and 2) a control spectrum of command and control (C2) channels, the coverage volume including at least one geofenced volume proximate to the control station;
    and
    at least one control processor coupled to the one or more antenna elements, the at least one control processor configured to execute a set of program instructions stored in memory, the set of program instructions configured to cause the at least one control processor to:
        generate one or more flight plans through the coverage volume, the one or more flight plans configured for beyond visual line of sight (BVLOS) execution by a first UAS of the three or more UAS, wherein the first flight plan includes an interference portion that, when flown by the first UAS, will cause interference with the other two or more UAS, the first flight plan configured to:
            provide physical separation between the first UAS and at least one of the other two or more UAS;
            dynamically reallocate the control spectrum as the first UAS enters the interference portion of the coverage volume; and
            establish a C2 connection for the first UAS at a first end of the control spectrum;
        based on the first flight plan, establish C2 connections for the other two or more UAS, the C2 connections corresponding to a single non-interference channel C2 channel at a second end of the control spectrum; and
        transmit one or more C2 messages to the three or more UAS.

2. The UAS control apparatus of claim 1, wherein:
    the at least one control processor is configured to restrict a count of the other two or more UAS operating within the coverage volume to no more than a count of the one or more second C2 channels comprising the non-interference portion.

3. The UAS control apparatus of claim 1, wherein the at least one control processor is configured for one of expanding or restricting a bandwidth corresponding to at least one second C2 channel within the at least one non-interference portion.

4. The UAS control apparatus of claim 1, wherein the at least one control processor is configured to transmit the one or more C2 messages to the first UAS via the C2 connection within the interference portion of the control spectrum at a reduced power level.

5. The UAS control apparatus of claim 1, wherein:
    the interference portion is associated with a first end of the control spectrum;
    and
    the at least one non-interference portion is associated with a second end of the spectrum, the second end opposite the first end.

6. The UAS control apparatus of claim 1, wherein the coverage volume is a first coverage volume and the control apparatus is a first control apparatus, and the at least one control processor is configured to:
    switch at least one of the other two or more UAS over to a second control apparatus associated with a second coverage volume adjacent to the first coverage volume.

7. The UAS control apparatus of claim 1, wherein the coverage volume is a first coverage volume and the control apparatus is a first control apparatus, and the at least one control processor is configured to:
    reassign at least one portion of the control spectrum to at least one second control apparatus associated with a second coverage volume.

8. The UAS control apparatus of claim 1, wherein the one or more antenna elements include one or more directional antenna elements configured to transmit to at least one subset volume within the coverage volume.

9. The UAS control apparatus of claim 1, wherein the other two or more UAS receive C2 communications via alternating timeslots.

* * * * *